(12) United States Patent
Shimada

(10) Patent No.: US 6,553,008 B1
(45) Date of Patent: Apr. 22, 2003

(54) MULTIDIRECTIONAL TIME-DIVISION MULTIPLEXING WIRELESS DATA COMMUNICATIONS SYSTEM

(75) Inventor: Hideaki Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/233,101

(22) Filed: Jan. 19, 1999

(30) Foreign Application Priority Data

Jan. 19, 1998 (JP) .......................................... 10-022704

(51) Int. Cl.⁷ ................................................ H04Q 7/00
(52) U.S. Cl. ....................... 370/314; 370/336; 370/337; 370/539; 714/6; 714/7; 714/758
(58) Field of Search ................................ 370/389, 337, 370/394, 314, 471, 474, 538–545, 336; 714/6, 7, 48, 49, 50, 51, 52, 701, 746, 751, 758, 761, 762

(56) References Cited

U.S. PATENT DOCUMENTS

| | | | |
|---|---|---|---|
| 5,636,208 A | | 6/1997 | Chang et al. |
| 5,867,510 A | * | 2/1999 | Steele .......................... 714/758 |
| 5,905,741 A | * | 5/1999 | Matsukuma et al. ........ 714/758 |
| 5,951,709 A | * | 9/1999 | Tanaka ......................... 714/755 |
| 6,094,740 A | * | 7/2000 | Boccuzzi et al. ............ 714/793 |

FOREIGN PATENT DOCUMENTS

| | | |
|---|---|---|
| CA | 2169514 | 9/1996 |
| JP | 62-8630 | 1/1987 |
| JP | 63-204934 | 8/1988 |
| JP | 63-204937 | 8/1988 |
| JP | 1-188137 | 7/1989 |
| JP | 2-16826 | 1/1990 |
| JP | 2-253734 | 10/1990 |
| JP | 3-285427 | 12/1991 |
| JP | 4-2232 | 1/1992 |
| JP | 5-292057 | 11/1993 |
| JP | 6-61937 | 3/1994 |
| JP | 6-97918 | 4/1994 |
| JP | 6-188862 | 7/1994 |
| JP | 7-87562 | 3/1995 |
| JP | 9-116444 | 5/1997 |
| JP | 9-247117 | 9/1997 |
| JP | 11-4203 | 1/1999 |

* cited by examiner

Primary Examiner—Edward F. Urban
Assistant Examiner—Temica M. Davis
(74) Attorney, Agent, or Firm—Sughrue Mion, PLLC (57) ABSTRACT

A multidirectional time-division multiplexing wireless data communications system can prevent erroneous data from being transmitted through a data communication line even when a bit error has occurred in transmission data. An error correcting redundant bit, obtained by performing an error correcting code operation on a low-speed continuous signal, is multiplexed to a specific vacant slot in a wireless frame. A burst signal, converted by a continuous/burst signal conversion circuit through an interleaving operation, is multiplexed to a predetermined time slot, and transmitted to a wireless area. The burst signal is received by the conversion circuit, and converted into a continuous signal through a de-interleaving operation. A division circuit divides an error correcting code to generate a syndrome. Based on the syndrome, an error position detection circuit specifies bit error position in data, and an addition circuit corrects errors.

8 Claims, 8 Drawing Sheets

Fig. 1

Fig. 3A CONTINUOUS SIGNAL

Fig. 3B INTERNAL STATE OF RAM

Fig. 3C BURST SIGNAL

Fig. 4A BURST SIGNAL

Fig. 4B INTERNAL STATE OF RAM

Fig. 4C CONTINUOUS SIGNAL

MULTIDIRECTIONAL TIME-DIVISION MULTIPLEXING WIRELESS DATA COMMUNICATIONS SYSTEM

BACKGROUND OF THE INVENTION

1. Field of the Invention

The present invention relates to a multidirectional time-division multiplexing wireless data communications system, and more specifically to a multidirectional time-division multiplexing wireless data communications system for fixedly assigning a wireless time slot used between a first station and a second station, for example, between a parent station and a child station, and establishing communications between plural pieces of data terminal equipment connected to the stations.

2. Description of the Related Art

In a wireless system for establishing multidirectional time-division multiplexing communications, the one-to-N time-division multiplexing communications are established between a parent station and a plurality of child stations which communicate with the parent station.

At this time, in the telephone communications using a system in which both telephone communications and data communications are set, a channel assigning process is controlled by a demand-assign system for assigning a wireless communications channel between the parent station and the child stations only when a call is issued from the parent station or the child stations.

In the data communications, the channel assigning process is controlled by the pressing system for preliminarily and fixedly assigning a wireless communications channel for use in the data communications between data terminal equipment connected to the parent station and data terminal equipment, connected to a child station, for communicating with the data terminal equipment connected to the parent station.

Figure 5:
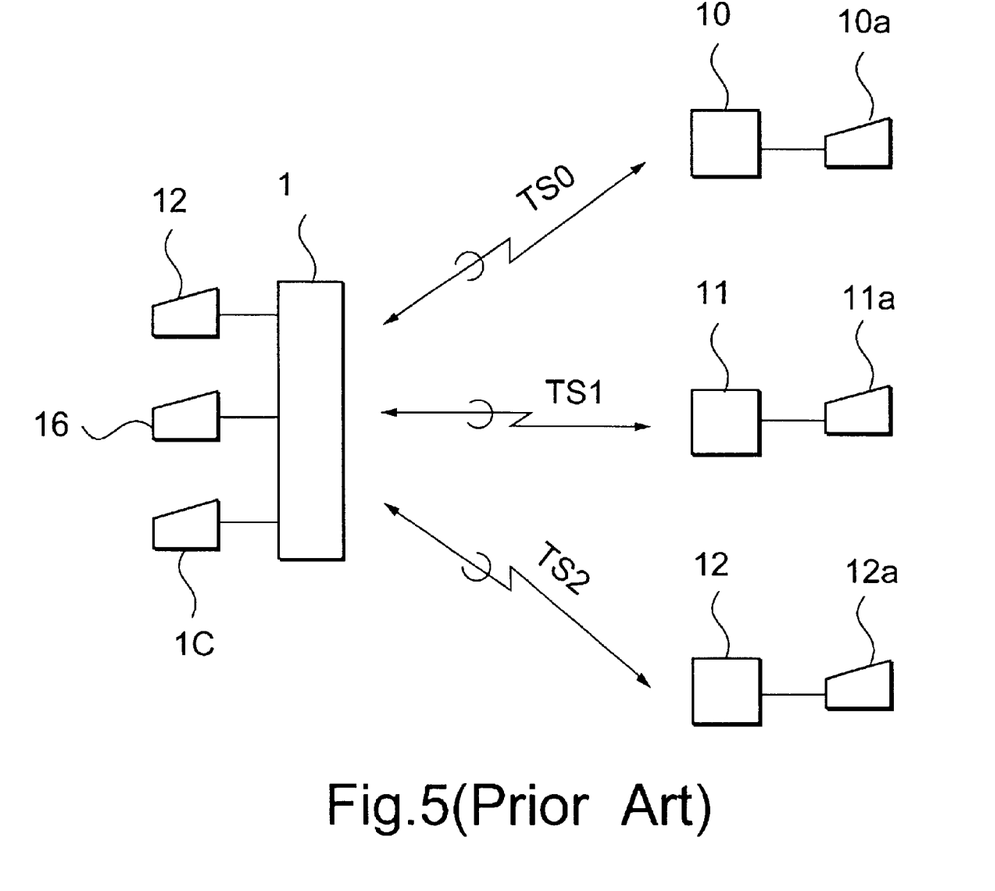
FIG. 5 is a block diagram of the configuration of the conventional multidirectional time-division multiplexing wireless data communications system.

FIG. 5 is a block diagram of the configuration of the conventional multidirectional time-division multiplexing wireless data communications system. The multidirectional time-division multiplexing wireless data communications system shown in FIG. 5 includes a parent station 1, plural pieces of data terminal equipment 1a, 1b, and 1c connected to the parent station 1, child stations 10, 11, and 12 for performing wireless communications with the parent station 1, and data terminal equipment 10a, 11a, and 12a connected to the child stations 10, 11, and 12.

The data communications are performed by a time-division multiplexing system (hereinafter referred to as a TDM system) in the;downstream from the parent station 1 to the child stations 10 through 12 while the data communications are performed by a time-division multiple attachment system (hereinafter referred to as a TDMA system) in the upstream from the child stations 10 through 12 to the parent station 1.

Described below are the operations in which the data terminal equipment 1a and the data terminal equipment 10a; the data terminal equipment 1b and the data terminal equipment 11a; and the data terminal equipment 1c and the data terminal equipment 12a communicate with each other respectively.

First, a wireless time slot for use as a wireless communications channel is preliminarily and fixedly assigned to each data terminal equipment.

That is, a wireless time slot TS0 is fixedly assigned to the data terminal equipment 1a and the data terminal equipment 10a, a wireless time slot TS1 is fixedly assigned to the data terminal equipment 1b and the data terminal equipment 11a, and a wireless time slot TS2 is fixedly assigned to the data terminal equipment 1c and the data terminal equipment 12a.

Figure 6:
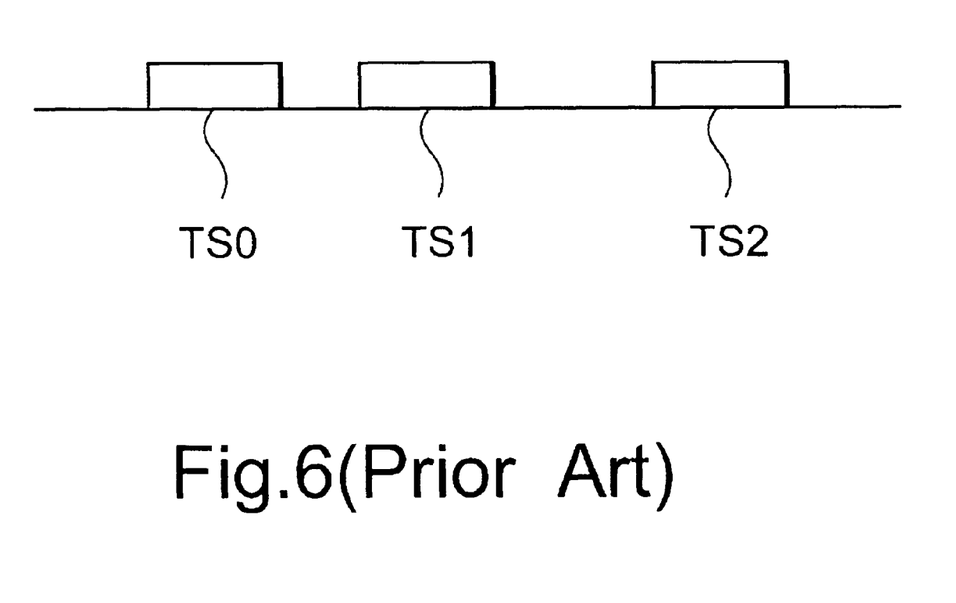
FIG. 6 shows a wireless time slot used as a wireless communications channel for each data terminal equipment in the multidirectional time-division multiplexing wireless data communications system shown in FIG. 5.

As shown in FIG. 6, the wireless time slot TS0, the wireless time slot TS1, and the wireless time slot TS2 are assigned to separate positions without overlapping each other about a time axis, and the signals transmitted through respective time slots do not crash each other.

When a call is issued to any data terminal equipment in the multidirectional time-division multiplexing wireless data communications system, the data communications can be established between corresponding data terminal equipment because a wireless time slot is assigned to each data terminal.

In the downstream data transmission, data signals transmitted from the data terminal equipment 1a, the data terminal equipment 1b, and the data terminal equipment 1c are input to the parent station 1, multiplexed by the parent station 1, and then transmitted to the child station 10, the child station 11, and the child station 12 by the TDM system.

That is, a data signal from the data terminal equipment 1a is multiplexed to the wireless time slot TS0, a data signal from the data terminal equipment 1b is multiplexed to the wireless time slot TS1, and a data signal from the data terminal equipment 1c is multiplexed to the wireless time slot TS2. Thus, the multiplexed burst data signals are transmitted to the child stations 10 through 12 by the TDM system.

The same signals are transmitted to the child stations 10 through 12.

Each of the child stations 10 through 12 retrieves, by separating and selecting, the data signal addressed to itself, and transmits the data signal to the connected data terminal equipment.

That is, the data signal multiplexed to the wireless time slot TS0 is separated by the child station 10 and transmitted to the data terminal equipment 10a, the data signal multiplexed to the wireless time slot TS1 is separated by the child station 11 and transmitted to the data terminal equipment 11a, and the data signal multiplexed to the wireless time slot TS2 is separated by the child station 12 and transmitted to the data terminal equipment 12a.

In the upstream data transmission, a data signal from the data terminal equipment connected to the child station is multiplexed to a wireless time slot assigned by each child station, and transmitted to the parent station as a burst signal by the TDMA system.

That is, the data signal from the data terminal equipment 10a is ;input to the child station 10, multiplexed to the wireless time slot TS0, and transmitted to the parent station 1.

Similarly, the data signal from the data terminal equipment 11a is input to the child station 11, multiplexed to the wireless time slot TS1, and transmitted to the parent station 1. The data signal from the data terminal equipment 12a is input to the child station 12, multiplexed to the wireless time slot TS2, and transmitted to the parent station 1.

The parent station 1 separates and retrieves the data signal from each of the child stations 10 through 12, and transmits the corresponding data signal to the connected data terminal equipment.

That is, the data signal multiplexed to the wireless time slot TS0 is transmitted to the data terminal equipment 1a, the data signal multiplexed to the wireless time slot TS1 is transmitted to the data terminal equipment 1b, and the data signal multiplexed to the wireless time slot TS2 is transmitted to the data terminal equipment 1c.

For convenience in explanation in reference to FIG. 5, the number of child stations is set to 3, and the number of pieces of data terminal equipment connected to each of the child stations 10 through 12 is set to 1. The circuit, signal line, etc. that are not specifically important are omitted here. However, the similar operations are performed on the case in which the number of child stations is other than 3, and in which plural pieces of data terminal equipment are connected to one child station.

Figure 7:
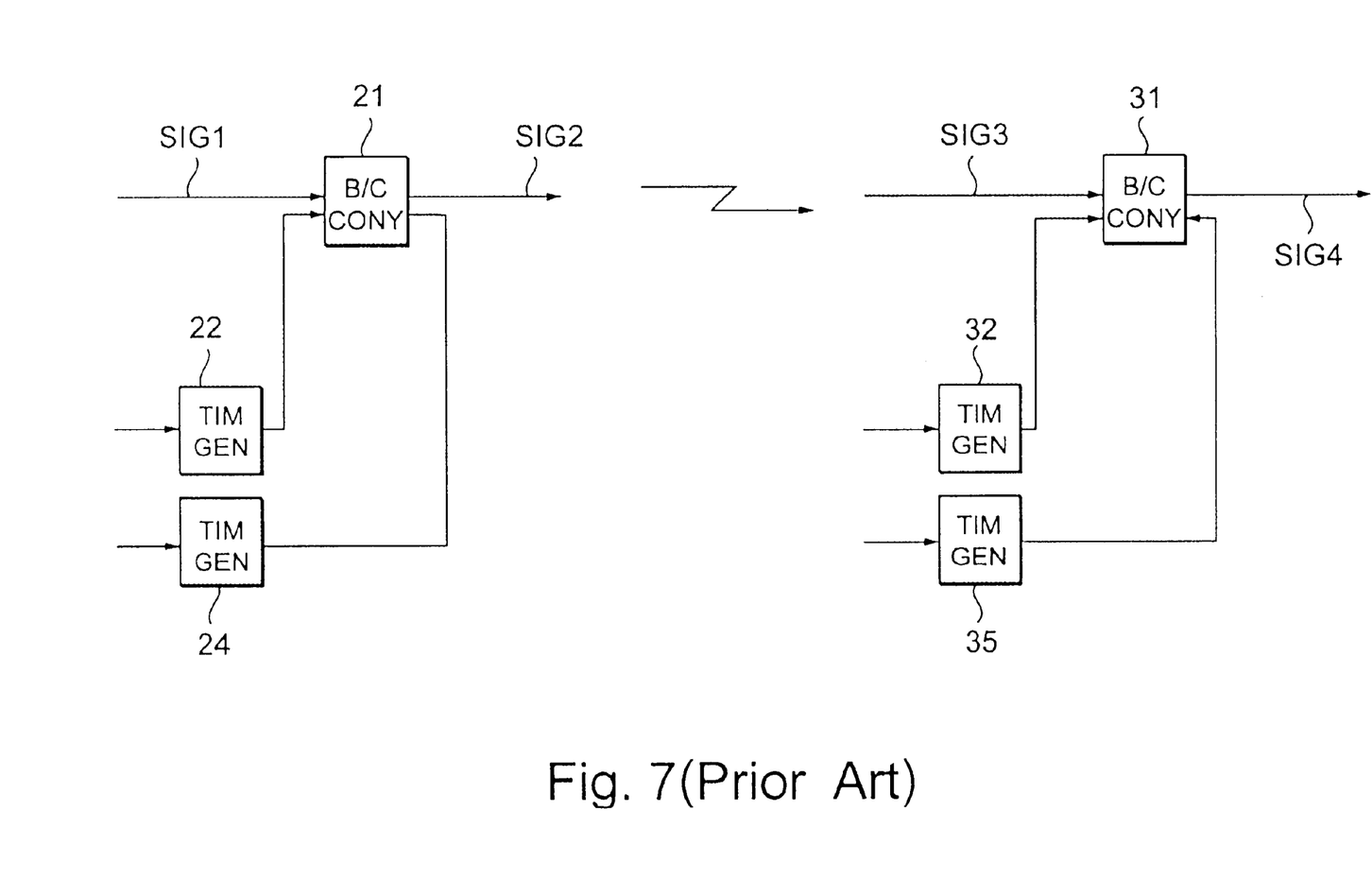
FIG. 7 is a block diagram of the configuration of the multidirectional time-division multiplexing wireless data communications system used when one-to-one data transmission is performed by the conventional multidirectional time division multiplexing wireless data communications system.

Described below is a one-to-one data transmitting operation. FIG. 7 shows the most popular conventional technology of this type.

In the first station, according to a timing signal generated by a timing signal generation circuit (TIM GEN) 22, a low-speed continuous signal SIG1 input from the data terminal equipment is input to a continuous/burst signal conversion circuit (C/B CONV) 21 in which the data is stored.

The timing signal generation circuit 22 generates a timing signal required when the low-speed continuous signal SIG1 is periodically input to the continuous/burst signal conversion circuit 21.

The data stored in the continuous/burst signal conversion circuit 21 is read according to the timing signal generated by a timing signal generation circuit 24, and transmitted to a wireless area as a high-speed burst signal SIG2.

The timing signal generation circuit 24 generates a timing signal required when the data stored in the continuous/burst signal conversion circuit 21 is periodically read in units of bits required by the unit burst data from the clock signal synchronous with the high-speed burst signal SIG2 on the wireless side.

That is, the timing between the low-speed continuous signal SIG1 and the high-speed burst signal SIG2 is shown in FIGS. 8A, 8B, 8C, and 8D.

Figures 8A, 8B:
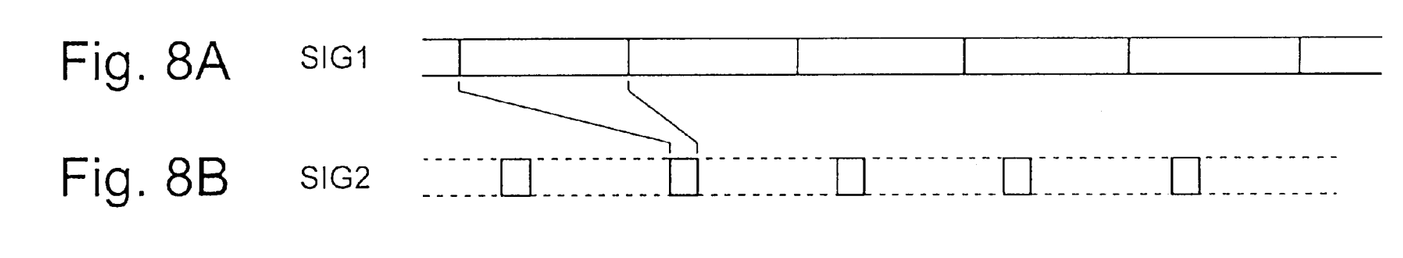
FIGS. 8A, 8B, 8C, and 8D are timing charts for explanation about the timings of the signals applied to the multidirectional time-division multiplexing wireless data communications system shown in FIG. 7.

In the second station, when the high-speed burst signal SIG2 (shown in FIG. 8A) transmitted from the continuous/burst signal conversion circuit 21 for converting the low-speed continuous signal SIG1 as shown in FIG. 8A into a high-speed burst signal is transmitted from the first station, it is received as a burst signal SIG3 (FIG. 8C) through a wireless area, and input to a burst/continuous signal conversion circuit 31 according to a timing signal generated by a timing signal generation circuit 32 in which a burst signal is stored.

The timing signal generation circuit 32 generates a timing signal required when the burst signal SIG3 is periodically input in units of bits required by the unit burst data from the clock signal synchronous with the burst signal SIG3 to the burst/continuous signal conversion circuit 31.

The data stored in the burst/continuous signal conversion circuit 31 is read by the timing signal generation circuit 35 according to a generated timing signal, and is output to the data terminal equipment as a low-speed continuous signal SIG4.

A timing signal generation circuit 35 generates a timing signal required when the data stored in the burst/continuous signal conversion circuit 31 is periodically read from the clock signal synchronous with the low-speed continuous signal SIG4.

Figures 8C, 8D:
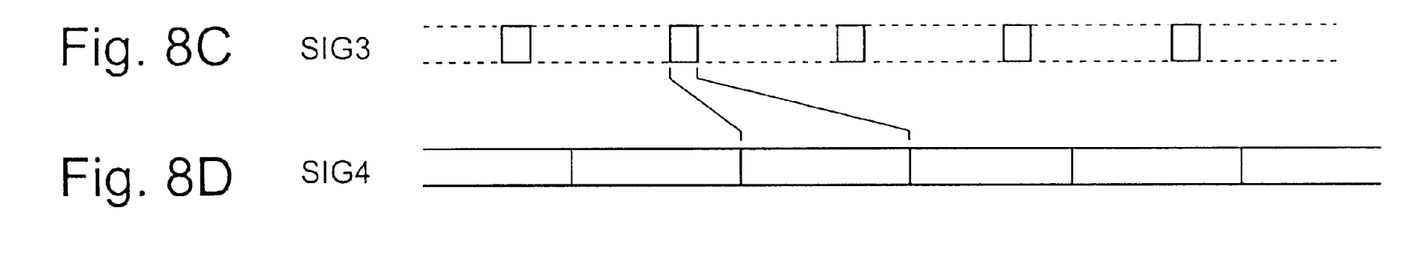

That is, the timing between the burst signal SIG3 and the low speed continuous signal SIG4 is shown in FIGS. 8C and 8D.

As described above, regardless of the direction from the parent station to the child station, or from the child station to the parent station, similar operations can be performed in either direction.

In the conventional multidirectional time-division multiplexing wireless data communications system as shown in FIG. 7, the velocity of only the low-speed continuous data on the data terminal equipment side and the high-speed burst data on the wireless area side is converted, and the data is transmitted through the wireless area. Therefore, when interference or phasing occurs, its influence directly reaches the system, thereby generating a data signal bit error.

As a result, there arises the problem that an erroneous data signal is transmitted through a data communications line.

SUMMARY OF THE INVENTION

The present invention has been developed to solve the above described problems with the conventional technology, and aims at providing a multidirectional time-division multiplexing wireless data communications system capable of attenuating the influence of a bit error even if it occurs in a data signal to be transmitted due to the interference or phasing generated in the wireless area.

To attain the above described purpose, when the first station receives a low-speed continuous signal at the continuous/burst signal conversion circuit from the data terminal equipment in the multidirectional time-division multiplexing wireless data communications system according to the present invention, the signal is stored in the circuit, and converted into a high-speed burst signal. At the same time, the error correcting code circuit performs an error correcting code operation on a continuous signal in units of bits required by the unit burst data, and outputs an error correcting redundant bit.

The burst signal read from the continuous/burst signal conversion circuit is multiplexed to a predetermined wireless time slot preliminarily assigned by the multiplexing circuit. Simultaneously, the error correcting redundant bit output from the error correcting code circuit is multiplexed to a specific vacant slot in a wireless frame, and is transmitted as a high-speed burst signal to a wireless area.

On the other hand, in the second station, the burst/continuous signal conversion circuit temporarily stores a high-speed burst signal transmitted from a multiplexing circuit through a wireless area, and reads it as a low-speed continuous signal.

The read low-speed continuous signal is input to a division circuit. The division circuit divides a bit string forming an error correcting code in a continuous signal by a predetermined polynomial, and generates a syndrome for the error correcting code.

Based on the syndrome, an error position detecting circuit specifies a position at which a bit error has occurred in the data, and outputs it to the addition circuit.

According to the low-speed continuous signal read from the burst/continuous signal conversion circuit, the addition circuit inverts the bits detected by the error position detecting circuit at the position where the error has occurred, thus correcting the error.

DETAILED DESCRIPTION OF THE PREFERRED EMBODIMENTS

Next, the embodiments of the multidirectional time-division multiplexing wireless data communications system according to the present invention are described below by referring to the attached drawings.

Figure 1:
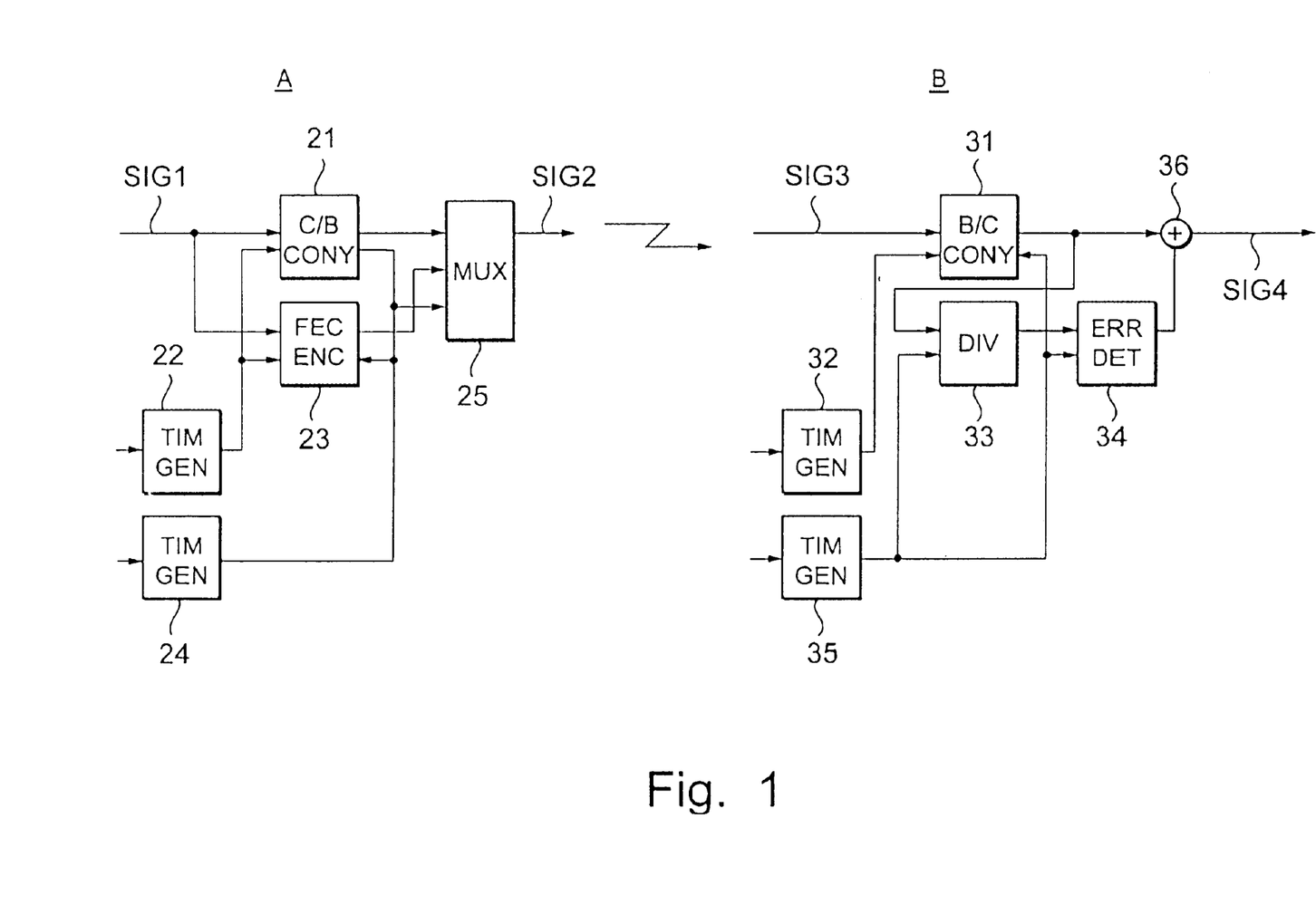
FIG. 1 is a block diagram of the configuration of the multidirectional time-division multiplexing wireless data communications system.

FIG. 1 is a block diagram of the configuration of an embodiment of the present invention. FIG. 1 shows the configuration of a one-to-one data transmission system.

At one station A as the first station such as a parent station, the continuous/burst signal conversion circuit 21 and the error correcting code circuit 23 receive a low-speed continuous signal SIG1 input from data terminal equipment (not shown in FIG. 1).

In addition, the continuous/burst signal conversion circuit 21 and the error correcting code circuit 23 receive timing signals output respectively from the timing signal generation circuit 22 and the timing signal generation circuit 24.

The timing signal generation circuit 22 generates from a clock signal synchronous with the low-speed continuous signal SIG1 a timing signal required when the low-speed continuous signal SIG1 is periodically input to the continuous/burst signal conversion circuit 21, and a timing signal required when the error correcting code circuit 23 performs an error correcting code operation.

The timing signal generation circuit 24 reads data stored in the continuous/burst signal conversion circuit 21 from the clock signal synchronous with the high-speed burst signal SIG2 described later, and generates a timing signal required for output of an error correcting redundant bit from the error correcting code circuit 23.

The continuous/burst signal conversion circuit 21 stores an input low-speed continuous signal SIG1 according to the timing signal output from the timing signal generation circuit 22, reads it as a high-speed burst signal according to the timing signal output from the timing signal generation circuit 24, and converts the continuous signal into a burst signal.

When the low-speed continuous signal SIG1 to the continuous/burst signal conversion circuit 21 and the timing signal from the timing signal generation circuit 22 are input, the low-speed continuous signal SIG1 and the timing signal are also simultaneously input to the error correcting code circuit 23. According to the timing signal from the timing signal generation circuit 22, the error correcting code circuit, 23 performs an error correcting code (such as a BCH code) operation on the low-speed continuous signal SIG1 in units of bits required by unit burst data based on the timing signal, and generates an error correcting redundant bit from the operation result.

The error correcting redundant bit generated by the error correcting code circuit 23 is transmitted to a multiplexing circuit 25.

The multiplexing circuit 25 receives a timing signal generated by the timing signal generation circuit 24, a burst signal output from the continuous/burst signal conversion circuit 21, and an error correcting redundant bit.

The multiplexing circuit 25 multiplexes the burst signal output from the continuous/burst signal conversion circuit 21 to a preliminarily assigned specific wireless time slot, and the error correcting redundant bit output from the error correcting code circuit 23 to a specific vacant slot in a wireless frame, and outputs the multiplexed wireless and high-speed burst signal SIG2 to the wireless area.

Described next is the configuration of the other station B, that is, the second station such as a child station.

The burst/continuous signal conversion circuit 31 stores a received burst signal SIG3 according to a timing signal generated by the timing signal generation circuit 32, and reads it as a low-speed continuous signal according to a timing signal generated by the timing signal generation circuit 35.

The timing signal generation circuit 32 generates a timing signal received when the burst signal SIG3 is periodically input to the burst/continuous signal conversion circuit 31 in units of bits required by unit burst data.

A continuous signal converted from a burst signal by the burst/continuous signal conversion circuit 31 is output to a division circuit 33 and an addition circuit 36.

The division circuit 33 performs a dividing operation on a bit string forming an error correcting code in the continuous signal output from the burst/continuous signal conversion circuit 31 using a preliminarily determined polynomial, and generates a syndrome for the error correcting code.

The generated syndrome is output to an error position detection circuit 34.

The error position detection circuit 34 also receives a timing signal generated by the timing signal generation circuit 35.

The error position detection circuit 34 specifies a position at which a bit error has occurred in the continuous signal according to the timing signal generated by the timing signal generation circuit 35 based on the syndrome output from the division circuit 33, and outputs the result to the addition circuit. 36.

The addition circuit 36 corrects an error by inverting bits at the position where the error has occurred in the low-speed continuous signal read by the burst/continuous signal conversion circuit 31.

The timing signal generation circuit 35 generates a timing signal required when the data stored in the burst/continuous signal conversion circuit 31 is periodically read from the clock signal synchronous with the low-speed continuous signal SIG4, and a timing signal requires in the operation of the division circuit 33 and the error position detection circuit 34.

With the above described configuration, the operations performed according to an embodiment of the present invention are described below.

In one station A, a low-speed continuous signal SIG1 input from the data terminal equipment is periodically input to the continuous/burst signal conversion circuit 21. The continuous/burst signal conversion circuit 21 stores the low-speed continuous signal SIG1 according to the timing signal generated by the timing signal generation circuit 22.

Simultaneously, the low-speed continuous signal SIG1 is also input to the error correcting code circuit 23. The error correcting code circuit 23 performs an error correcting code (BCH code, etc.) operation in units of bits required by unit burst data according to the timing signal generated by the timing signal generation circuit 22.

The data of the low-speed continuous signal SIG1 stored in the continuous/burst signal conversion circuit 21 is periodically read in units of bits required by the unit burst data according to the timing signal generated by the timing signal generation circuit 24, and is transmitted to the multiplexing circuit 25.

In addition, as a result of the error correcting code operation performed by the error correcting code circuit 23, a generated error correcting redundant bit is read according to the timing signal generated by the timing signal generation circuit 24, and transmitted to the multiplexing circuit 25.

The multiplexing circuit 25 multiplexes the burst signal output from the continuous/burst signal conversion circuit 21 to a preliminarily assigned specific wireless time slot, multiplexes the error correcting redundant bit output from the error correcting code circuit 23 to a specific vacant slot in a wireless frame, and outputs it as a high-speed burst signal SIG2 to a wireless area.

Figure 2A:
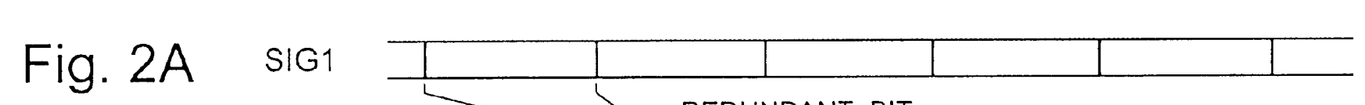
FIGS. 2A, 2B, 2C, and 2D are timing charts for explanation about the timings of the signals applied to the multidirectional time-division multiplexing wireless data communications system shown in FIG. 1.
Figure 2B:
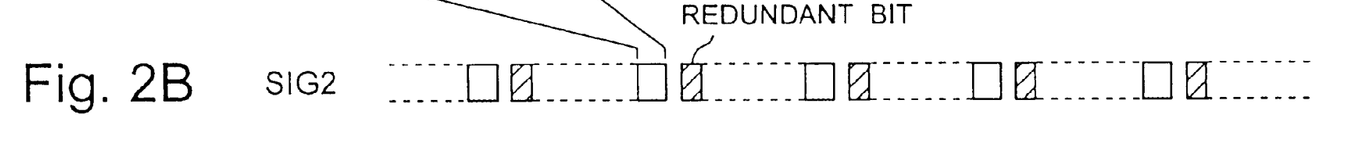
Figure 2C:
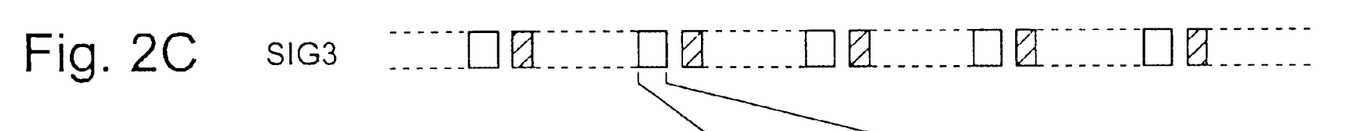
Figure 2D:
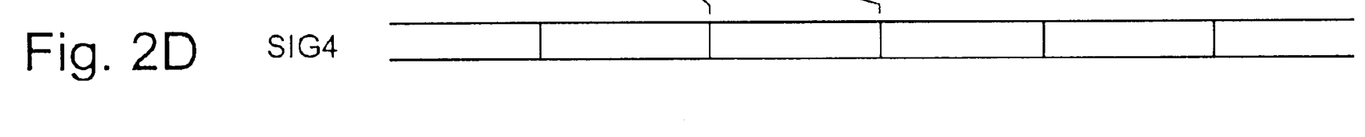

Thus, the timings of the low-speed continuous signal SIG1 and the high-speed burst signal SIG2 converted from the low-speed continuous signal SIG1 are respectively shown in FIGS. 2A and 2B.

Figure 3A:
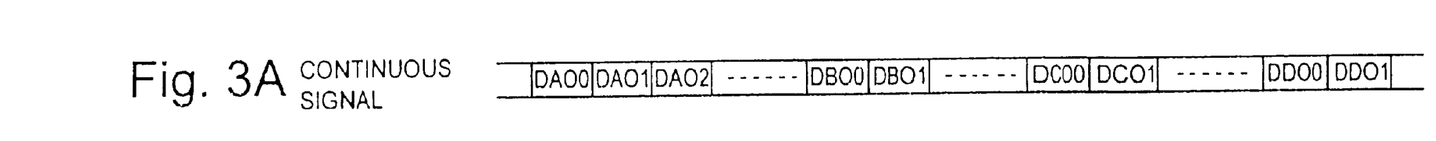
FIGS. 3A, 3B, and 3C show the state of writing and reading continuous signals by the continuous/burst signal conversion circuit in the multidirectional time-division multiplexing wireless data communications system shown in FIG. 1.
Figure 3B:
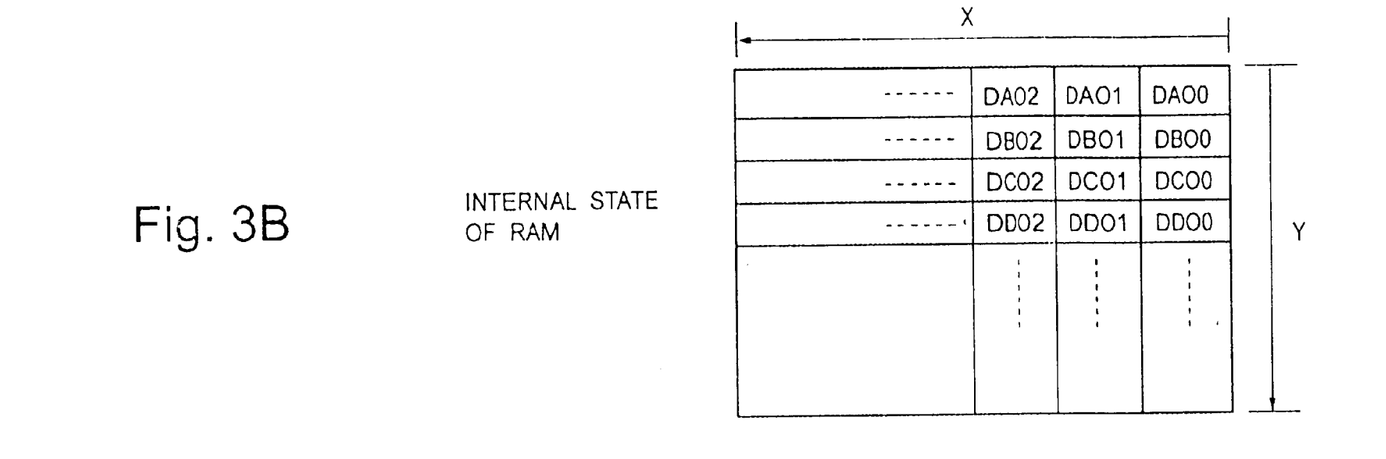

The operations of the continuous/burst signal conversion circuit 21 are described furthermore in detail by referring to FIGS. 3A and 3B.

The continuous/burst signal conversion circuit 21 normally comprises RAM, and the low-speed continuous signal SIG1 is written to RAM 37 shown in FIG. 3B in the order of the input bit string as shown in FIG. 3A.

That is, bits are written in time series of the input bit string in order from smallest address value to largest address value of the RAM 37 (in the X direction shown in FIG. 3B.)

Figure 3C:
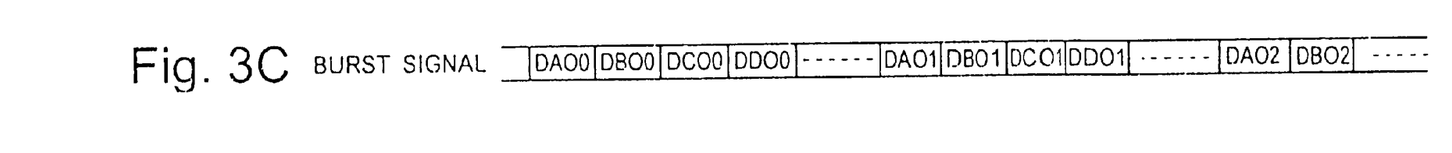

When the bits written to the RAM 37 are read as a high-speed burst signal (shown in FIG. 3C), the input bit string is distributed in time series by discretely circulating, not in order from smallest to largest of, the address value (in the Y direction shown in FIG. 3B), and is output through an interleaving operation.

Next, the operation of the other station B is described below by referring back to FIG. 1. The high-speed burst signal SIG2 transmitted from the opposing station (that is, the first station A) to a wireless area is received as a burst signal SIG3 (FIG. 2) through the wireless area according to the timing signal generated by the timing signal generation circuit 32 in the burst/continuous signal conversion circuit 31 of the other station B.

The timing signal is synchronous with the clock signal of the burst signal SIG3. According to the timing signal, the burst signal SIG3 is periodically stored by the burst/continuous signal conversion circuit 31 in units of bits required by the unit burst signal.

The burst signal stored in the burst/continuous signal conversion circuit 31 is periodically read from the clock synchronized with the low-speed continuous signal SIG4 (FIG. 2D) according to the timing signal generated by the timing signal generation circuit 35, and then output to the division circuit 33.

The division circuit 33 performs a dividing operation using a predetermined polynomial on the bit string comprising an error correcting code in the continuous signal according to the timing signal output from the timing signal generation circuit 35, thereby generating a syndrome for the error correcting code.

This syndrome is output to the error position detection circuit 34. The error position detection circuit 34 specifies the position at which a bit error has occurred in the continuous signal, and outputs it to the addition circuit 36 according to the timing signal generated by the timing signal generation circuit 35.

The addition circuit 36 inverts bits in which errors has occurred in the low-speed continuous signal read from the burst/continuous signal conversion circuit 31, and then corrects errors.

The data after the error correction is output from the addition circuit 36 to the data terminal equipment, not shown in the drawings, as the low-speed continuous signal SIG4.

The timings of the low-speed continuous signal SIG4 and the high-speed burst signal SIG3 are shown in FIG. 4.

Figures 4A, 4B, 4C:
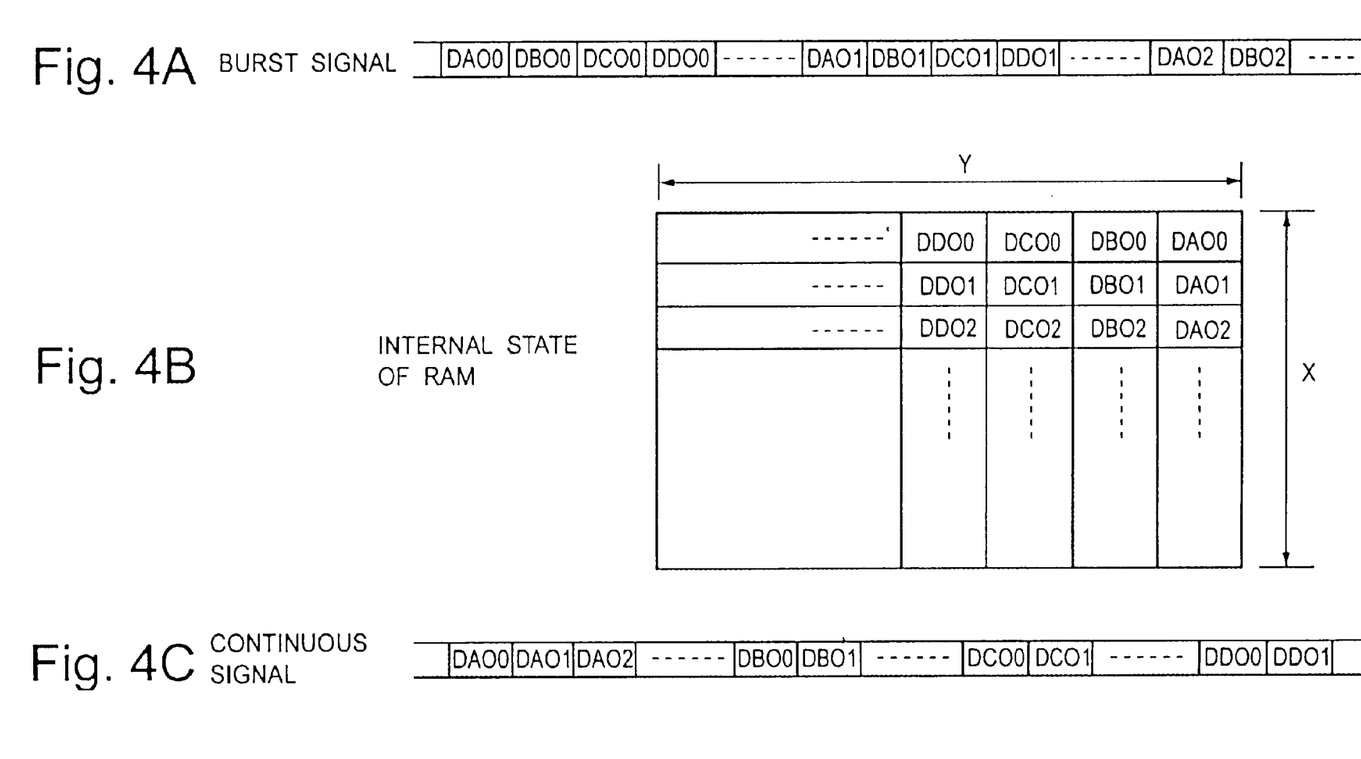
FIGS. 4A, 4B, and 4C show the state of writing and reading burst signals by the burst/continuous signal conversion circuit in the multidirectional time-division multiplexing wireless data communications system shown in FIG. 1.

By referring to FIG. 4, the detailed operation of the burst/continuous signal conversion circuit 31 is described below. The burst/continuous signal conversion circuit 31 normal y comprises RAM, and the high-speed burst signal SIG3 shown ion FIG. 4A is written to RAM 38 shown in FIG. 4B in order of the Input bit string. That is, bits are written in time series of the input bit string in order from the smallest address value to largest address value of the RAM 38, that is, in the Y direction shown in FIG. 4B.

When the written bits are read as a low-speed continuous signal as shown in 4C, the address values, not in order from the smallest address value to largest address value, are discretely circulated (in the X direction in FIG. 4C) in the operation opposite to the case described by referring to FIG. 3B. Thus, the input bit string is de-interleaved, converted into an original continuous signal (SIG1), and then output.

In the description above, the similar operation can be performed regardless of the direction, that is, the operation can be performed either from the parent station to the child station, or from the child station to the parent station.

As described above, according to an embodiment of the present invention, a low-speed continuous signal is converted into a high-speed burst signal SIG2, and an error correcting redundant bit is multiplexed to a specific vacant slot in a wireless frame. Therefore, a speed conversion circuit is not required when a redundant bit is added. In addition, since the positions of the burst signal, that is, an information bit, and the redundant bit are preliminarily known in a wireless frame, an error correction coding word synchronous circuit is not required on the receiving side, thereby simplifying the configuration and reducing the entire cost of the system.

In addition, an error correcting operation is not performed on all wireless frames, but can be performed only on necessary subscribers for each unit subscriber interface. Therefore, errors are corrected depending on the type of signal to be transmitted. For example, errors are not corrected when a voice signal is converted into a digital signal for transmission, while errors are corrected when a digital data signal is transmitted from, for example, the data terminal equipment, etc.

Furthermore, even if burst interference arises in a wireless area and continuous bit errors arise in a data signal, the interleaving function distributes and transmits a data signal in a wireless area. Therefore, when an error correcting process is performed, bit errors are discrete, thereby considerably reducing the influence of the continuous bit errors on the data communications line.

The present invention is not limited to the above described embodiments. For example, the interleave cycle can be variable depending on the interference in a wireless area.

In addition, according to an embodiment of the present invention, when the other station B is a child station, it is assumed that the number of the child stations is other than 3, and that a piece of data terminal equipment is attached. However, similar effects can be obtained when the number of child stations is other than 3, and plural pieces of data terminal equipment are connected to one child station.

As described above, according to the present invention, a low-speed continuous signal is converted into a high-speed burst signal SIG2 while performing an interleaving operation, and the resultant signal is multiplexed to a predetermined wireless time slot. At the same time, an error correcting redundant bit, which is used in an error correcting code operation performed on the low-speed continuous signal in units of bits required by unit burst data, is multiplexed to a specific vacant slot in a wireless frame and transmitted to a wireless area. On the receiving side, a dividing operation is performed on an error correcting code in the continuous signal converted while performing a de-interleaving operation, and a syndrome is generated from the burst signal. According to the syndrome, a position at which a bit error has occurred in the continuous signal is specified for error correction. As a result, through interference or phasing arising in the wireless area, an erroneous data signal is prevented from being transmitted through data communications line even if a bit error has arisen in a data signal to be transmitted, thereby considerably reducing the influence of the transmission of an erroneous data signal.

What is claimed is:

1. A multidirectional time-division multiplexing wireless data communications system for establishing data communications between a parent station and a plurality of child stations by a multidirectional time-division multiplexing method, wherein:

said parent station comprises:
means for converting a low-speed continuous signal input from data terminal equipment into a high-speed burst signal;,
means for performing an error correcting code operation on the continuous signal in units of bits required by a unit burst data, and outputting an error correcting redundant bit; and
means for multiplexing the burst signal to a predetermined time slot, multiplexing the error correcting redundant bit to a specific vacant time slot, and transmitting a high-speed burst signal; and said child stations each comprises:
means for converting the high-speed burst signal into a low-speed continuous signal;
means for dividing an error correcting code in the continuous signal by a predetermined polynomial, and generating a syndrome; and
means for specifying a position at which a bit error has occurred in the data based on the syndrome, and correcting a bit in which the error has occurred.

2. A wireless data communications system, comprising:
a first station comprising:
at continuous/burst signal conversion circuit for storing-a low-speed continuous signal input from data terminal equipment, converting the signal into a high-speed burst signal, and reading the signal;
an error correcting code circuit for performing an error correcting code operation on the continuous signal in units of bits required by a unit burst data, and outputting an error correcting redundant bit; and
a multiplexing circuit for multiplexing the burst signal output from said continuous/burst signal conversion circuit to a preliminarily assigned predetermined wireless time shot, multiplexing the error correcting redundant bit output from said error correcting code circuit to a specific vacant slot in a wireless frame, and transmitting a resultant high-speed burst signal to a wireless area; and a second station comprising:
a burst/continuous signal conversion circuit for storing the high-speed burst signal transmitted by said multiplexing circuit, and reading the burst signal as a low-speed continuous signal;
a division circuit for dividing a bit string forming an error correcting code in a continuous signal output from said burst/continuous signal conversion circuit by a predetermined polynomial, and generating a syndrome for an error correcting code;
an error position detection circuit for specifying a position at which a bit error has occurred in data based on the syndrome output from said division circuit; and
an addition circuit for correcting an error by inverting bits at which the error has occurred in a low-speed continuous signal read from said burst/continuous signal conversion circuit.

3. The system according to claim 2, wherein
said continuous/burst signal conversion circuit stores the low speed continuous signal according to a timing signal generated from a first timing signal generation circuit, and reads the signal as a high-speed burst signal according to a timing signal output from a second timing signal generation circuit.

4. The system according to claim 2, wherein
said error correcting code circuit performs an error correcting code operation of a BCH code on the low-speed continuous signal in units of bits required by a unit burst data.

5. The system according to claim 2, wherein
said burst/continuous signal conversion circuit stores a burst signal transmitted from said multiplexing circuit according to a timing signal generated from a third timing signal generation circuit, and reads a low-speed continuous signal according to a timing signal generated from a fourth timing signal generation circuit.

6. The system according to claim 2, wherein
said continuous/burst signal conversion circuit comprises first RAM, writes the low-speed continuous signal in time series of an input bit string in order from smallest address value to largest address value in order of the input bit string, and reads the signal as a high-speed burst signal by distributing the input bit string in time series and performing an interleaving operation through discrete circulation.

7. The system according to claim 2, wherein
said burst/continuous signal conversion circuit comprises second RAM, writes the high-speed burst signal in time series of an input bit string in order from smallest address value to largest address value in order of the input bit string, and reads the signal as a low-speed continuous signal by converting the signal into the original continuous signal and performing a de-interleaving operation through discrete circulation.

8. The system according to claim 6, wherein
said interleaving operation is performed on a variable cycle.

* * * * *